June 2, 1931. H. L. BERRY 1,807,771
REMOVABLE DIAPHRAGM FOR GAS METERS
Filed May 22, 1928 4 Sheets-Sheet 1
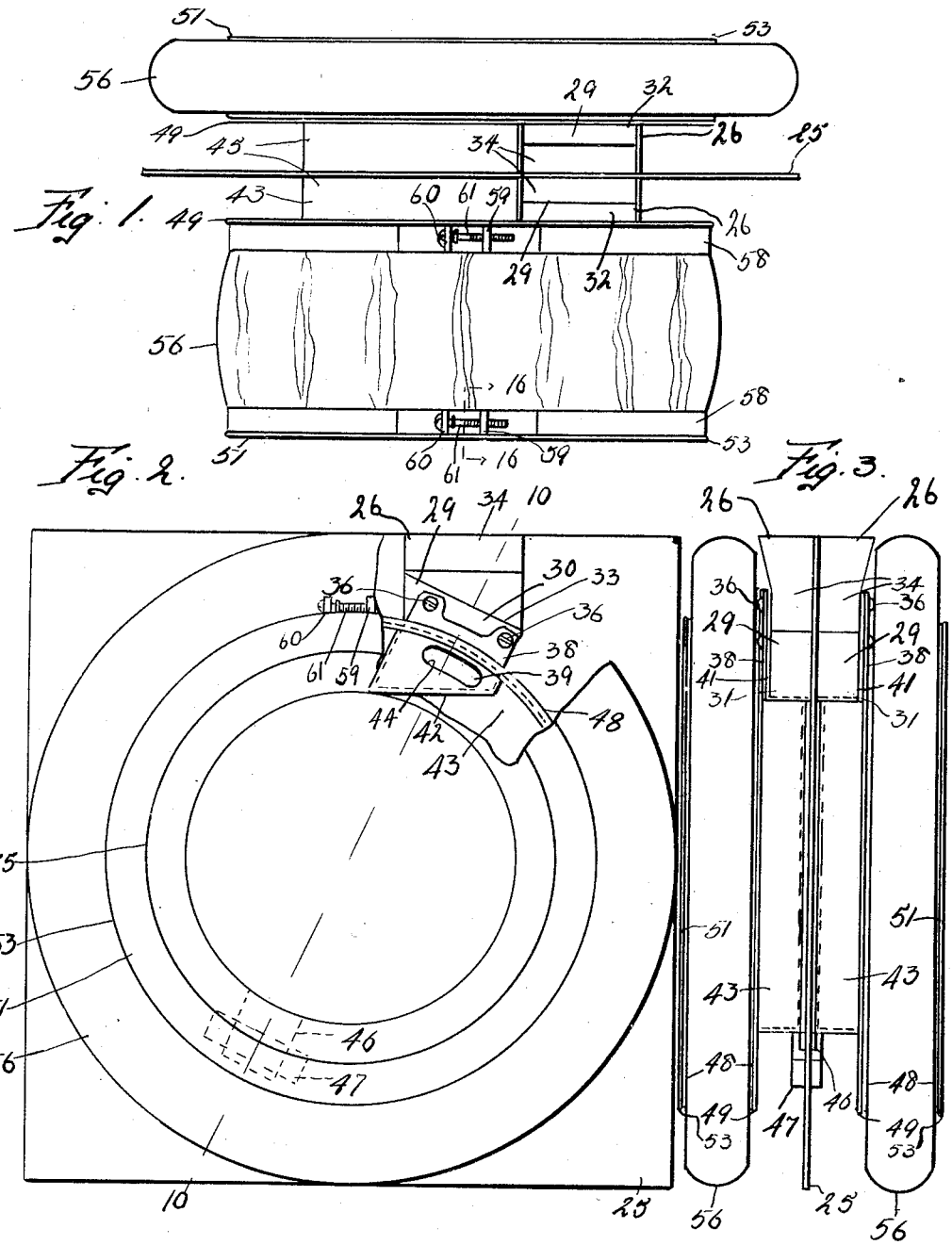
INVENTOR
Harry L. Berry
By W. W. Williamson
Atty.

June 2, 1931.  H. L. BERRY  1,807,771
REMOVABLE DIAPHRAGM FOR GAS METERS
Filed May 22, 1928  4 Sheets-Sheet 2
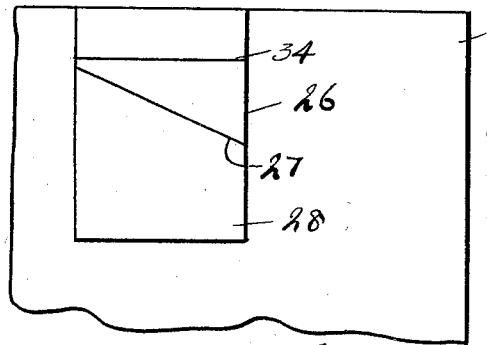
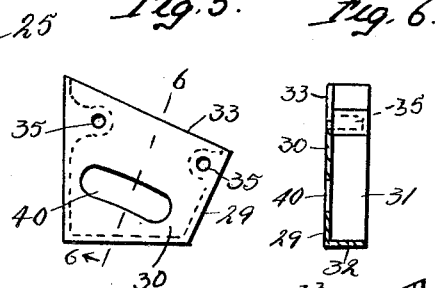
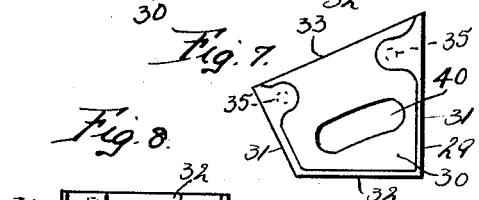
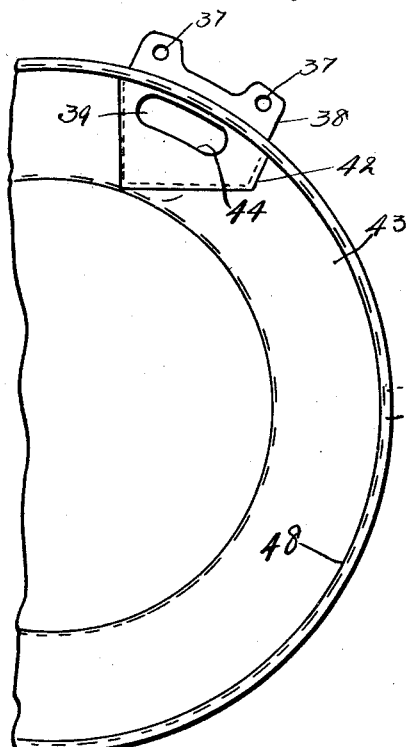
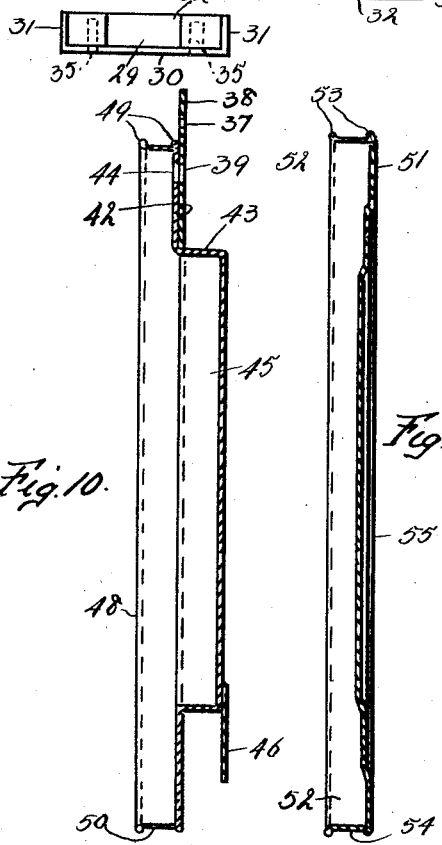
INVENTOR.
Harry L. Berry
By W. W. Williamson
Atty.

June 2, 1931. H. L. BERRY 1,807,771
REMOVABLE DIAPHRAGM FOR GAS METERS
Filed May 22, 1928 4 Sheets-Sheet 3

INVENTOR
Harry L. Berry
By W. W. Williamson
Atty.

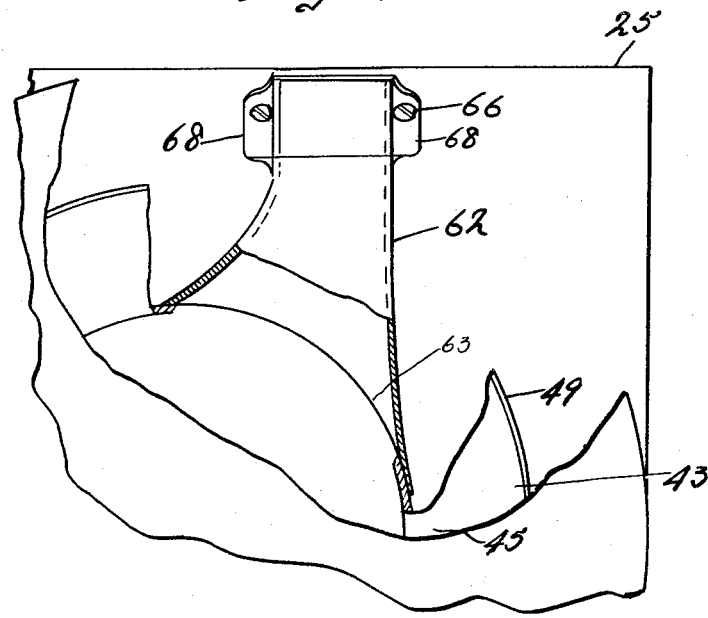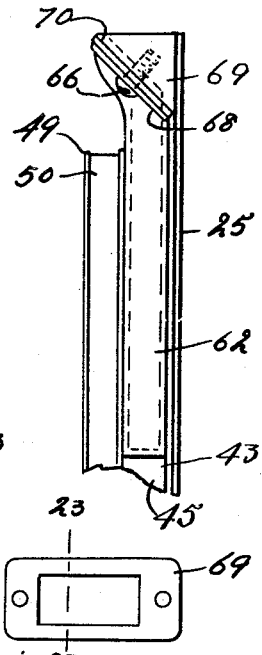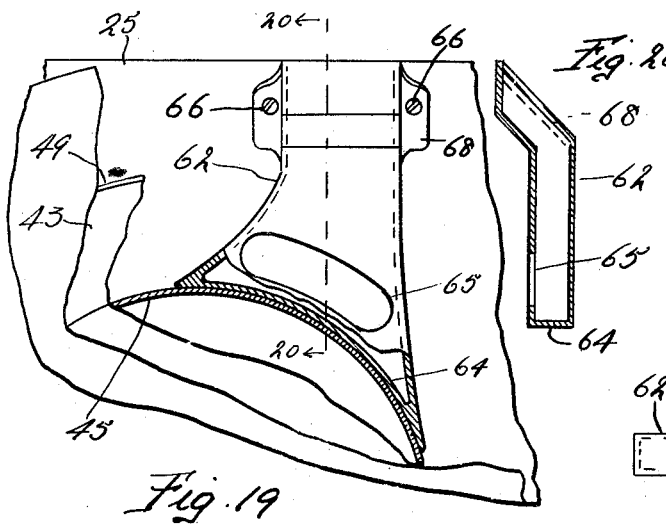

Patented June 2, 1931

1,807,771

UNITED STATES PATENT OFFICE

HARRY L. BERRY, OF ATLANTIC CITY, NEW JERSEY

REMOVABLE DIAPHRAGM FOR GAS METERS

Application filed May 22, 1928. Serial No. 279,763.

My invention relates to new and useful improvements in a removable diaphragm for gas meters and more particularly such diaphragms as are used in connection with what are known in the trade as tin meters and has for its primary object to provide a simple and effective construction whereby the diaphragm may be readily and quickly removed for repairs, cleaning, and the like, and which may be replaced or a new one substituted therefor.

Another object of the invention is to provide improved means for connecting the leather bellows portion of the diaphragm with the metal discs whereby the same may be removed from said discs without damaging any of the parts.

Another object of the invention is to provide improved means for detachably connecting the diaphragm with the meter pocket element and the partition, panel or plate.

Another object of the invention is to so construct the parts that a whole pocket or a section thereof may be removed from a previously constructed meter and a new pocket or section thereof substituted therefor and a bracket attached to a diaphragm whereby the latter may then be removably mounted in the meter.

A further object of the invention is to improve the construction of the bellows portion of the diaphragm to permit of its detachable connection with the discs.

A still further object of the invention is to provide flange discs all in one piece eliminating the necessity of soldering any of the parts.

With these ends in view, this invention consists in the details of construction and combination of elements hereinafter set forth and then specifically designated by the claims.

In order that those skilled in the art to which this invention appertains may understand how to use and make the same, I will describe its construction in detail, referring by numerals to the accompanying drawings forming a part of this application, in which:

Fig. 1 is a plan view of two diaphragms constructed in accordance with my invention and shown mounted upon the separating partition, panel or plate with one of the bellows collapsed and the other expanded.

Fig. 2 is a face view thereof with portions of the discs and the bellows of the near side diaphragm broken away to show the arrangement of the pocket embodied in one of the formations.

Fig. 3 is an edge or side elevation thereof.

Fig. 4 is a fragmentary face view of the plate and pocket of the old style meter showing how a portion of the pocket is to be cut and removed.

Fig. 5 is an outer face view of the sectional pocket to replace the portion of the pocket removed.

Fig. 6 is a section on the line 6—6 of Fig. 5.

Fig. 7 is an edge view of the sectional pocket.

Fig. 8 is an edge view thereof.

Fig. 9 is a fragmentary inner face view of the innermost disc illustrating the manner in which a bracket is mounted thereon so that said disc with the other component parts of the diaphragm may be detachably mounted.

Fig. 10 is a section of said disc and bracket taken on the line 10—10 of Fig. 2.

Fig. 11 is a similar view of the outermost disc.

Fig. 17 is a fragmentary face view of another form of the invention similar to Fig. 2 of another form of the invention with portions of the discs and bellows being broken away and a part of the pocket shown in section.

Fig. 18 is an edge view of Fig. 17, showing only one of the bellows on the plate.

Fig. 19 is a view similar to Fig. 17 illustrating a different arrangement for providing a communication between the interiors of the diaphragm and pocket.

Fig. 20 is a section of the pocket on the line 20—20 of Fig. 19.

Fig. 21 is an outer end view of either of the pockets shown in Figs. 17 and 19.

Fig. 22 is a face view of the pocket support.

Fig. 23 is a section of Fig. 22 on the line 23—23.

Figure 12:
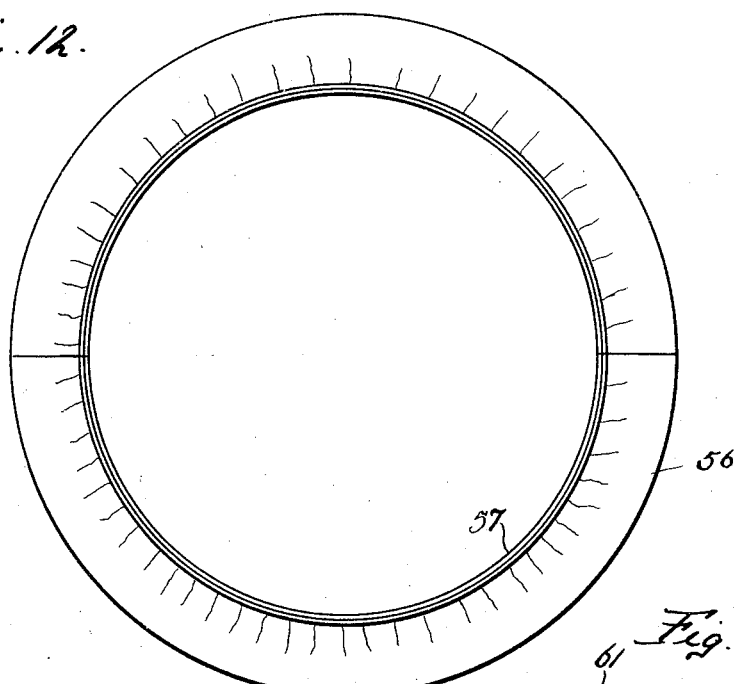
Fig. 12 is an end view of the bellows per se.
Figure 13:
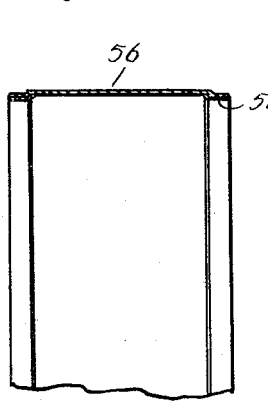
Fig. 13 is a fragmentary sectional view thereof illustrating it expanded.
Figure 14:
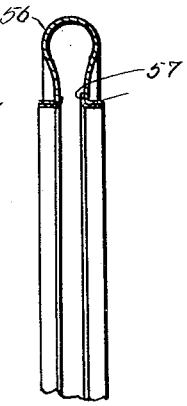
Fig. 14 is a similar view contracted or collapsed.

In carrying out my invention as embodied particularly in Figs. 1 to 16 inclusive, 25 represents the usual partition, panel or plate which divides the interior of an ordinary tin meter into two compartments in each of which is located a diaphragm, but since all of the parts are the same in each diaphragm, only one will be described.

On a face of the plate 25 is mounted the usual pocket 26, the upper or outer open end of which is connected with the usual clam shell (not shown).

In order to fit the removal diaphragm embodied in my invention within the meter, said pocket is severed along a transverse line 27 preferably diagonally produced as plainly shown in Fig. 4 and the section 28 is removed by heating the solder which connects it with the plate 25. Said section 28 is then replaced by the pocket or pocket section 29 of the same outline as the part 28 but consisting of a face wall 30, side walls 31 and an end wall 32. When properly positioned the oblique edge 33 contacts with the inner edge of the remaining section 34 of the pocket 26 and may then be soldered in place so that there will be no leakage.

The pocket section 29 is provided with screw receiving holes 35 into which project the screws 36 after first passing through holes 37 in the bracket 38, the latter, when in place, being superimposed or resting upon the pocket section 29 with the aperture 39 in said bracket coinciding with the aperture 40 in the pocket section 29 and a suitable compressible washer or gasket 41 interposed between them.

The bracket 38 is set in a depression 42 in the outer face of the inner disc 43 when considered with the disc removed from the plate, and the depressed portion has an aperture 44 registering with the aperture 39.

The disc 43 may have a central cupped portion 45 which will rest upon or engage the plate 25 when the diaphragm is in place with the bracket 38 resting on the pocket and said disk is provided with a tongue 46 diametrically opposite the bracket 38 for registration with a keeper 47 and said tongue is inserted in the keeper prior to fastening the bracket to the pocket.

The disc is provided with an integral annular flange 48 having a bead 49 at each end, thus providing a channel 50 for a purpose to be presently described.

An outer disc 51 is also provided and has an annular flange 52 formed as an integral part thereof, said flange having beads 53 at both ends to provide a channel 54, the purpose of which will be described in connection with the channel 50 on the disc 43. The disc 51 may be strengthened by slightly cupping it as at 55.

The bellows part of the diaphragm indicated by the numeral 56 consists of a relatively narrow long strip of leather produced from one, two or more sections and where more than one section is used, they are properly joined together at their ends in the manner well known in this art to prevent leakage and the ends of this strip of leather are joined together to produce a ring as plainly shown in Fig. 12 and on the inner face of this ring adjacent each edge is mounted a buffer 57 so as to hold the bellows in proper shape and to the proper size. The shaping and sizing of the diaphragm is accomplished apart from the discs but is of the same size as said discs so that it may be placed thereon when desired.

Figure 15:
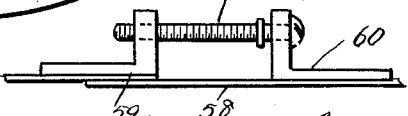
Fig. 15 is an enlarged fragmentary edge view of one of the bellows retaining hoops in the region of the clamp.
Figure 16:
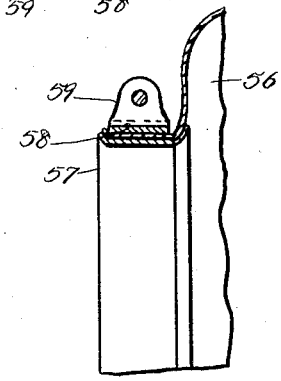
Fig. 16 is an enlarged fragmentary sectional view along the line 16—16 of Fig. 1.

In completing the diaphragm the bellows is placed over the flange of one of the discs and secured thereon and then the other end of the bellows is placed over the second disc and secured thereto and the securing means consists of a split hoop 58, the ends of which are designed to overlap each other as shown in Fig. 15 and with this in view, a lug 59 is secured to one of the ends of the hoop and another lug 60 is secured to the hoop adjacent the other end and the means for contracting said hoop may consist of a screw 61 swiveled in one of the lugs as 60, and having threaded engagement with the other lug which construction is shown in detail in Fig. 15. The hoops being placed about the ends of the bellows when the screws are turned in the proper direction, the ends of the hoops will be drawn together, thus clamping the ends of the bellows snugly into the channels 50 and 54.

A complete diaphragm constructed in this manner may then be removably mounted on the plate 25 by inserting the tongue 46 in the keeper 47 and afterwards fastening the bracket 28 to the pocket which has been previously reconstructed by replacing the section 28 of the old pocket with the section 29. Of course it will be understood that the walls of the pocket 29 may be extended to produce a pocket similar to the one shown in Fig. 4 and designated by the numeral 26 prior to being divided in which case the entire pocket 26 can be removed and the new pocket substituted therefor.

With the diaphragm in place, gas may then pass through the aligned apertures 40, 39 and 44 between the pocket and the interior of the diaphragm.

Should any of the parts become worn or otherwise damaged or need cleaning, said diaphragm may be readily removed by withdrawing the screws 36 and after the work in the diaphragm is completed it may be replaced or if more desirable a new diaphragm may be substituted therefor since all the parts are interchangeable. After the diaphragm has been removed, the damaged part may be replaced by another similar part as the hoops can be readily removed for the detachment of the bellows from both discs.

In Figs. 17 to 23, I have shown a slightly different form of the invention wherein the pocket is designated by the numeral 62 which is secured directly to the inner disc 43 with the inner end of the pocket opening directly into the diaphragm through an aperture 63 preferably formed in the annular side wall of the cupped portion 45 as shown in Fig. 17, or said inner end of the pocket may be closed by an end wall 64 while the outer face wall is provided with an aperture 65 for registration with an aperture in the disc similar to that designated by the numeral 44 in Figs. 9 and 10.

In this form of the invention, the pocket is in reality a rectangular conduit with the mouth arranged at a suitable angle to the body whereby fastening means 66, here shown as screws can be readily reached by a screw driver which will pass over the edge of the collapsed or contracted diaphragm and said screws pass through holes 67 in the ears 68 formed with the pocket at its mouth and for threaded connection with a pocket support 69 mounted in the proper angular position on the plate 25 to which it is soldered as well as to the clam shell so that an absolutely tight joint is produced.

A suitable compressible gasket 70 is placed between the mouth of the pocket and said pocket support.

In this form of the invention when it is desirable or necessary to make repairs or replacements, the screws 66 are removed which will thereafter permit the detachment of the complete diaphragm the same as described in connection with the other form.

A diaphragm constructed in this manner has many advantages but one of the outstanding advantages is the ease with which the parts may be removed and replaced and if necessary new parts substituted for old ones. Another advantage of a construction such as herein described is that the present-day or old style meters may be readily reconstructed by removing the attached diaphragm and pocket from the plate and then adding the parts necessary for the connection of my diaphragm to the plate so that the present-day meters are not damaged and the expense of reconstruction is very small.

Of course I do not wish to be limited to the exact details of construction as herein shown, as these may be varied within the limits of the appended claims without departing from the spirit of my invention.

Having thus fully described my invention, what I claim as new and useful is:—

1. A device of the kind described comprising a plate, a pocket section having an aperture and mounted on said plate in substitution for a portion of the original pocket, a diaphragm structure having apertures therein and including a bracket having an aperture, and means to detachably connect the bracket with the substituted pocket section and thereby complete a communication between the interior of the diaphragm structure and the pocket through the apertures in the diaphragm, bracket and substituted pocket section.

2. A device of the kind described comprising a plate, a pocket section mounted on said plate in substitution for the usual pocket and having an aperture, a diaphragm including an apertured disc having a depression, an apertured bracket mounted in the depression in the apertured disc, the apertures in the bracket and disc being in registration and aligning with the aperture in the pocket section on the plate when the diaphragm is properly positioned, and means engaging the bracket and pocket section for removably mounting the diaphragm on the plate.

3. A device of the kind described comprising a plate, a pocket section on said plate provided with a contact face arranged at an oblique angle to said plate, a diaphragm, a pocket carried thereby and having a mouth arranged at an oblique angle for coaction with the contact face of the pocket section and also provided with ears set at the same angle, and means passing through said ears and into the pocket section for detachably connecting said pocket to the pocket section and thus removably mounting the diaphragm on the plate.

4. A device of the kind described, comprising a plate, a pocket section mounted on said plate and having a straight passageway therethrough and provided with a contact face arranged at angle to said plate and extending away from the same so that the body of the pocket section is between its contact face and the plate on which the pocket section is mounted, a diaphragm structure, a pocket having a straight passageway therethrough mounted on the diaphragm structure and in communication with the interior thereof, said pocket having an angular contact face to fit the contact face of the pocket section, means to secure the pocket to said pocket section, thereby removably fastening the diaphragm structure to the pocket section.

In testimony whereof, I have hereunto affixed my signature.

HARRY L. BERRY.